April 2, 1968
F. BOTTASSO
3,375,714
APPARATUS FOR DETECTING, MEASURING AND RECORDING IRREGULARITIES
OF BEHAVIOR IN LOADED PNEUMATIC TIRES
Filed Oct. 23, 1965
6 Sheets-Sheet 3
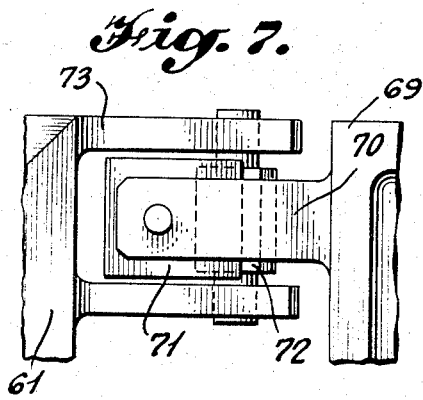
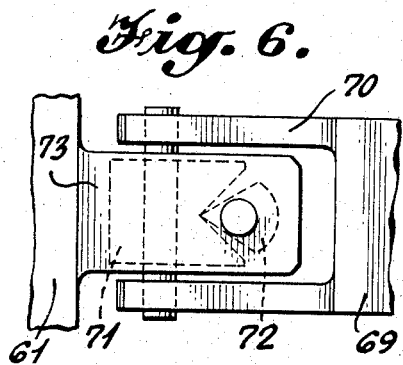
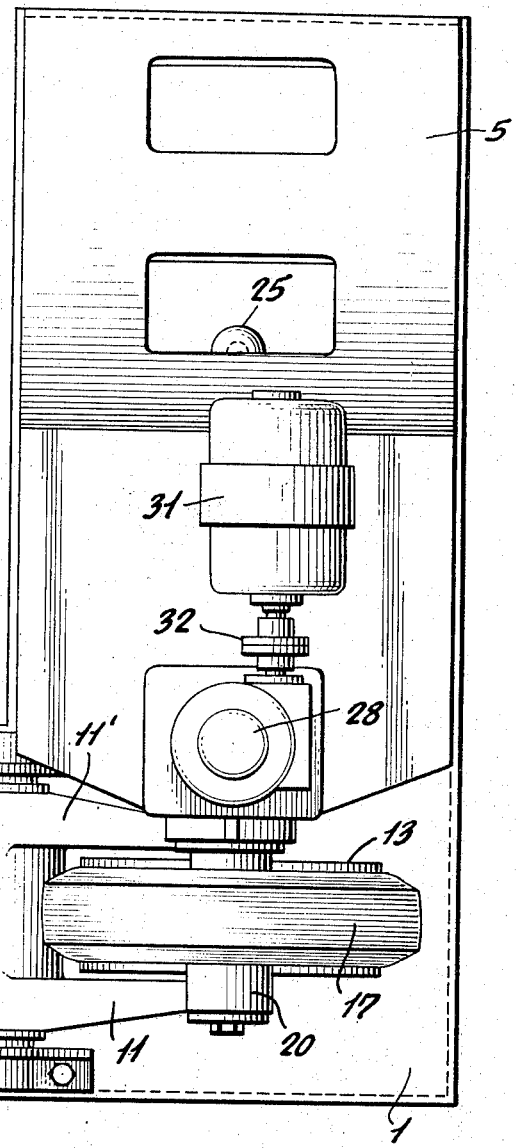
INVENTOR
Franco Bottasso
BY Stevens, Davis, Miller & Mosher
ATTORNEYS INVENTOR
Franco Bottasso

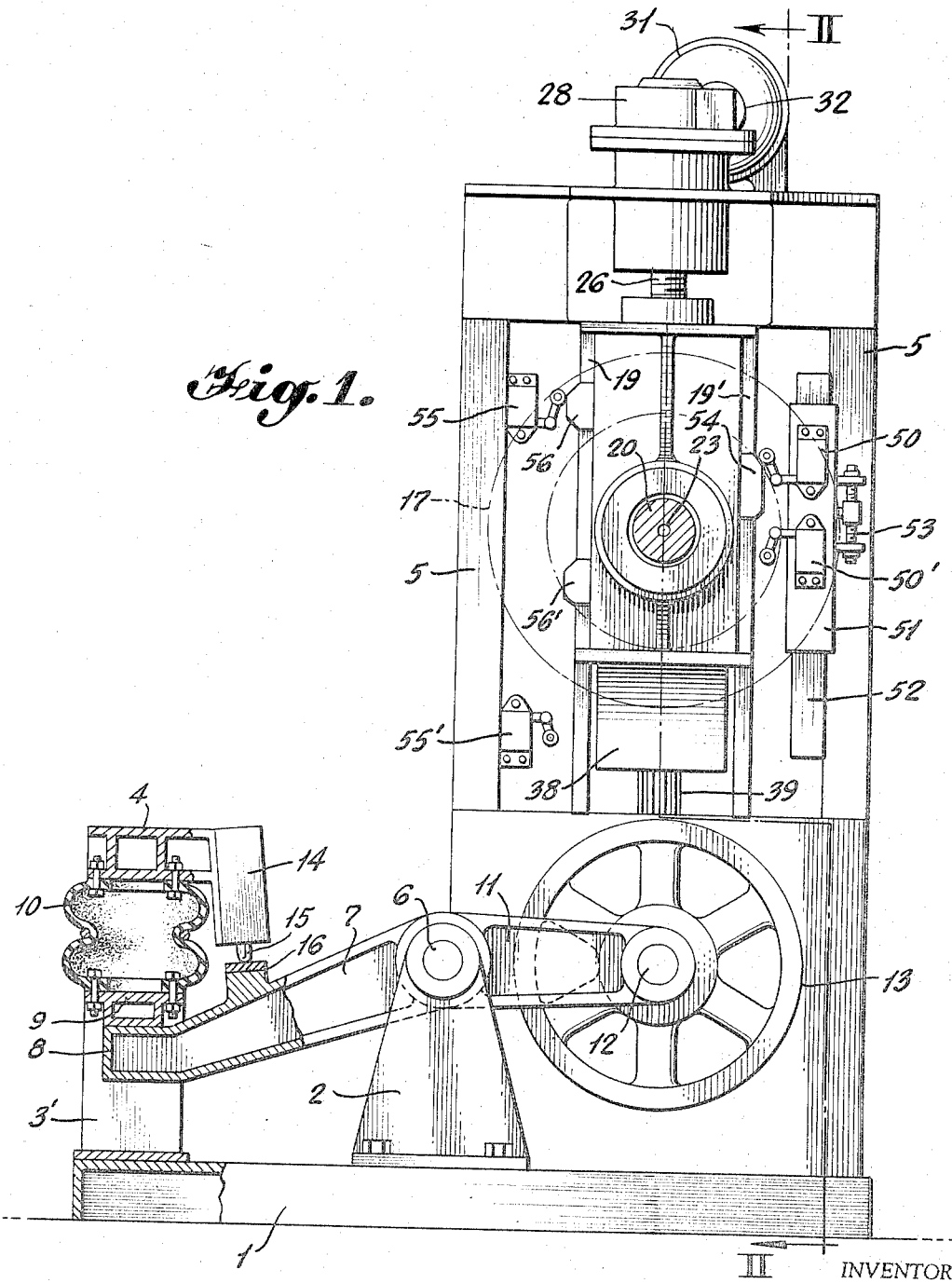

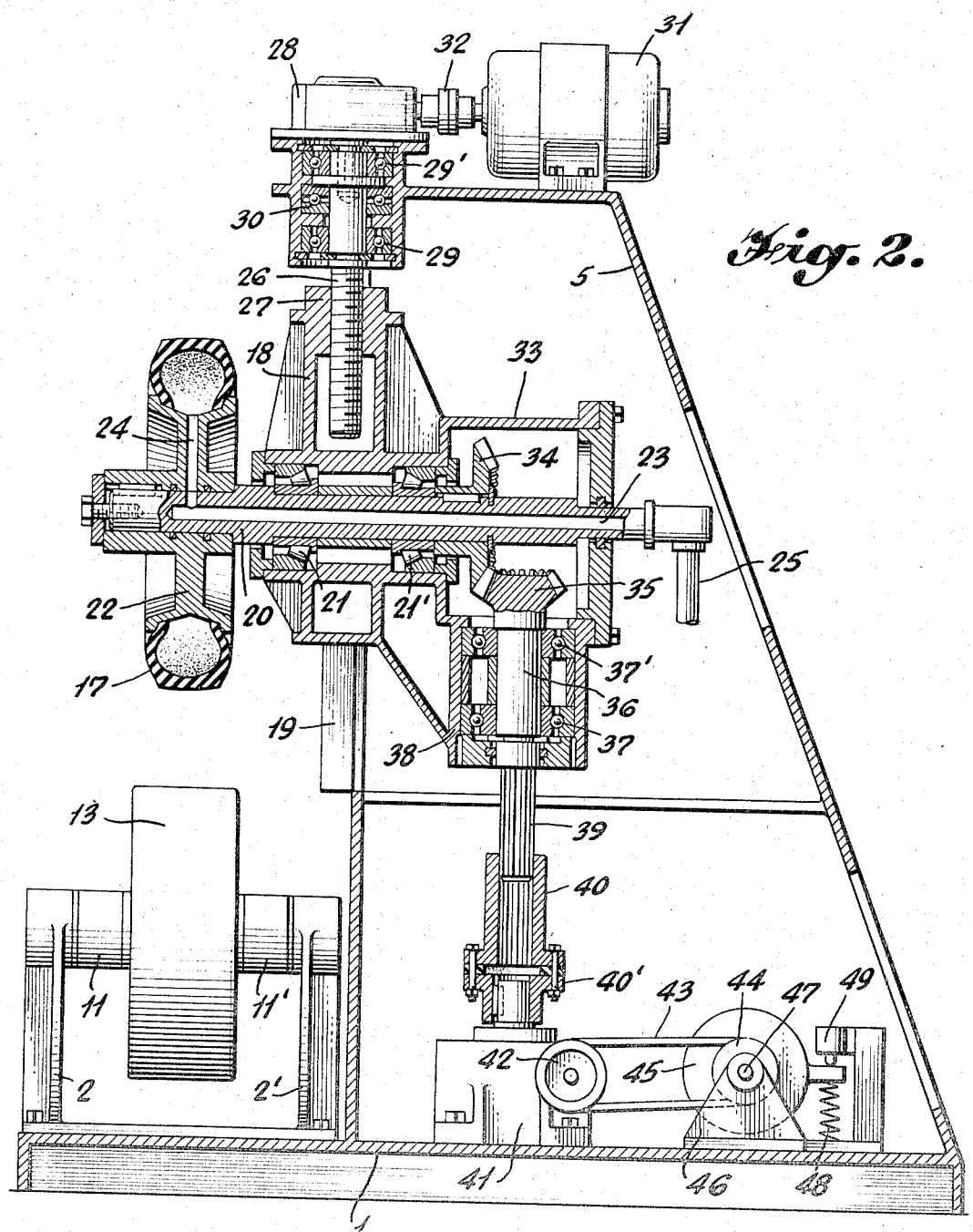

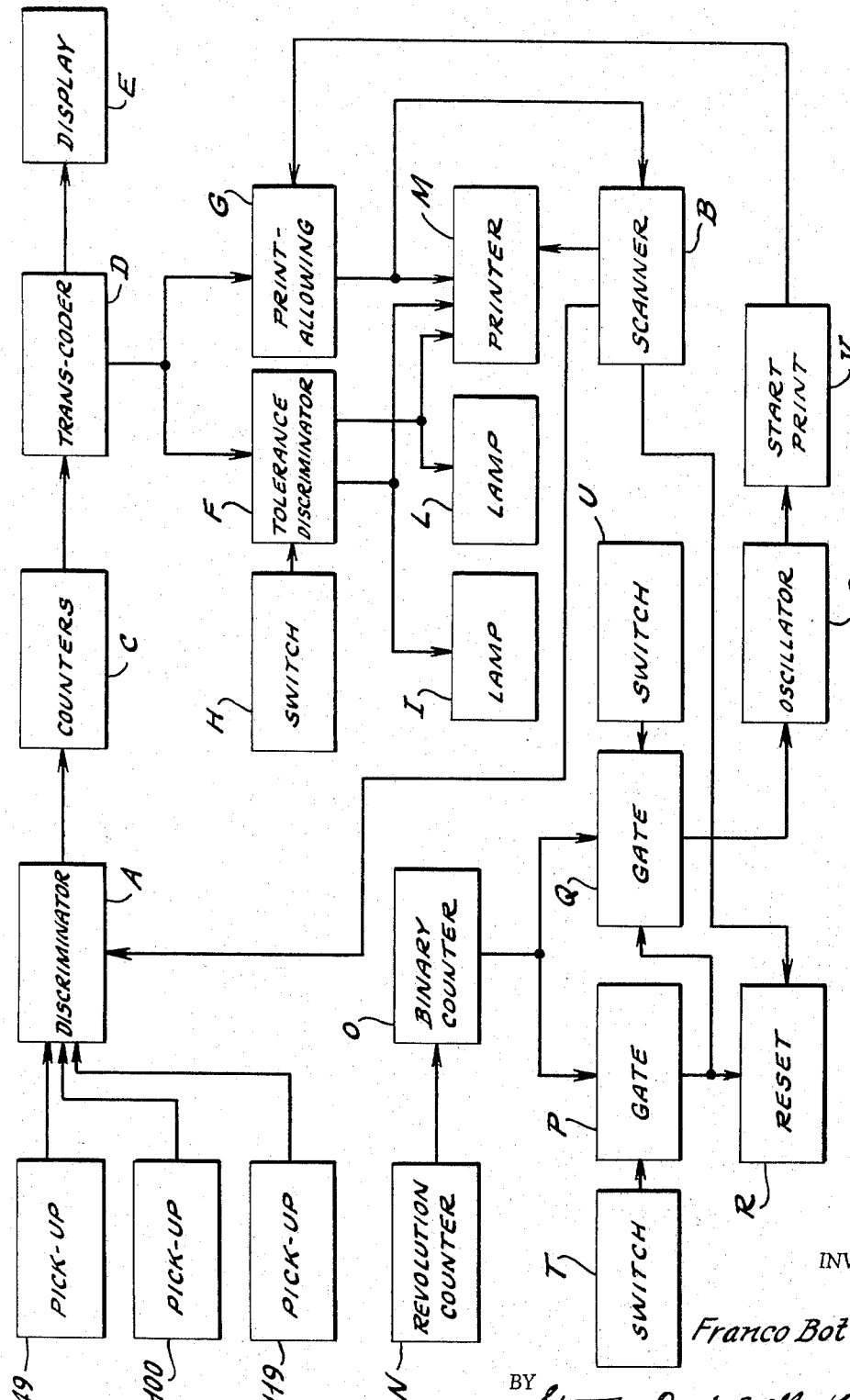

United States Patent Office 3,375,714
Patented Apr. 2, 1968

3,375,714
APPARATUS FOR DETECTING, MEASURING AND RECORDING IRREGULARITIES OF BEHAVIOR IN LOADED PNEUMATIC TIRES
Franco Bottasso, Milan, Italy, assignor to Pirelli S.p.A., Milan, Italy
Filed Oct. 23, 1965, Ser. No. 503,876
Claims priority, application Italy, Mar. 30, 1965,
7,016/65
13 Claims. (Cl. 73—146)

ABSTRACT OF THE DISCLOSURE

An apparatus for checking pneumatic tires comprising a support member carried by a frame and having a shaft rotatably mounted therein and adapted to support a tire to be tested. A support arm is pivotally mounted adjacent the frame and has a test drum loosely assembled on one end thereof. Means are provided to move the support member with respect to the frame to and from a position whereby said tire operatively engages the test drum, the other end of the support arm thus being displaced according to variations in the radius of said tire, said displacements being detected and displaced.

---

This invention relates to a checking device for pneumatic tires and more particularly to an apparatus for detecting, measuring and recording irregularities of behavior in loaded pneumatic tires. The building, moulding and vulcanizing of pneumatic tires give use to many defects which result in irregular behavior of the tires. For example, vehicle vibrations are caused by irregular variations in the radius of the loaded rotating tires. Furthermore, lateral thrusts often result, which tend to deviate the tire from its riding direction, even on smooth and rectilinear runs. Defects also cause irregular wear, static and dynamic unbalancing and so on.

An accurate checking of the tire is therefore necessary in order to evaluate whether these irregularities are contained within permissible values.

It is generally known to use various types of typical laboratory equipment to carry out such evaluation, which are rather complicated and require the employment of skilled operators. In general, the operation of such equipment is based on the measurement of forces requiring instruments needing an accurate initial calibration and a continuous control. Moreover, the recording of the data is effected by means of equipment of the analogue type which, in view of their normal industrial use, are less suitable for this purpose than the electronic digital apparatuses.

The object of the present invention is an improved apparatus able to detect, measure and record the irregularities of behavior in loaded rotating tires with the utmost exactness and reliability.

The quantities which are taken into consideration in the present invention, separately or in combination, are: the variation of the radius of the loaded tire, the lateral displacement of the test-drum caused by the drift thrust, the variation in the longitudinal force measured as an angular displacement of the stator of the motor which imparts rotation to the tire and which is assembled in swinging relation on a suitable support. For the purposes of the application, a "loaded tire" refers to a tire which has been inflated and which is rotating on a test-drum.

The apparatus in question is based on the measurement of displacements. It has been purposely adapted for industrial use and has been provided with an electronic measuring and recording unit of the digital type. Since periodic calibrations are unnecessary in a unit of this type, no skilled operators are required.

The apparatus generally consists of a test-drum loosely assembled on an arm provided with appropriate supporting and balancing means; a frame on which a slide may move in vertical direction, carrying a horizontal arm provided with a wheel on which the tire to be tested is assembled; means for controlling the displacement of the slide and means for rotating the tire to be tested; and means for indicating and recording the displacements of the supporting arm of the test-drum.

If it is desired to evaluate only the variations of the radius of the loaded rotating tire, the apparatus is provided with a single-piece oscillating arm. The action of the tire on the test-drum as their outer peripheral surfaces engage is opposed by an opposite action, carried out, for instance, by an air-spring applied at the opposite end of the arm. A digital pick-up then "feels" the displacements of the arm caused by variations in tire radius, and transmits them to the recording unit.

If it is desired to evaluate only the lateral displacements of the test-drum caused by the drift thrusts of the tire, the test-drum is assembled on a parallelogram shaped arm provided with linked connections and ball supports to allow the test-drum to remain always parallel to itself during its lateral displacements, the latter being opposed by the action of a spring. In this measurement the sensitive element is also a digital pick-up.

The apparatus used for measuring all three of the above quantities (variation of the radius of the loaded tire, lateral displacement, and variation of the longitudinal force) includes the above mentioned units in addition to a motor which controls the rotation of the tire under test and which is assembled with its stator swinging about its own axis. In this manner the variations of the longitudinal forces due to the defects of the tire are recorded by determining the variations of the torque necessary for the rotation of the tire by measuring with a digital pick-up the angular displacements of the stator of the motor.

These and other features of the present invention will now be described with reference to the attached drawings, which illustrate the embodiment of an apparatus for measuring the typical quantities in the behavior of loaded rotating tires, it being understood that such embodiment is given only by way of non-limitating example.

In said drawings:

FIG. 1 is a front view, partially sectioned, of an apparatus adapted to measure the variations of the radius and of the longitudinal force in loaded rotating tires;

FIG. 2 is the cross section II—II of the apparatus shown in FIG. 1;

FIG. 3 is a top view of the apparatus shown in FIG. 1;

FIGS. 6 and 7 represent in front view and in top view respectively, a detail of the linked connection of the supporting arm of the test-drum;

FIG. 10 represents the blocks diagram of the electronic circuit for measuring and recording the data resulting from the tests, this circuit being connected to the apparatus for the combined measurement of the variations of the radius, the lateral displacements and the variations of longitudinal force in the loaded rotating tires.

Figure 4:
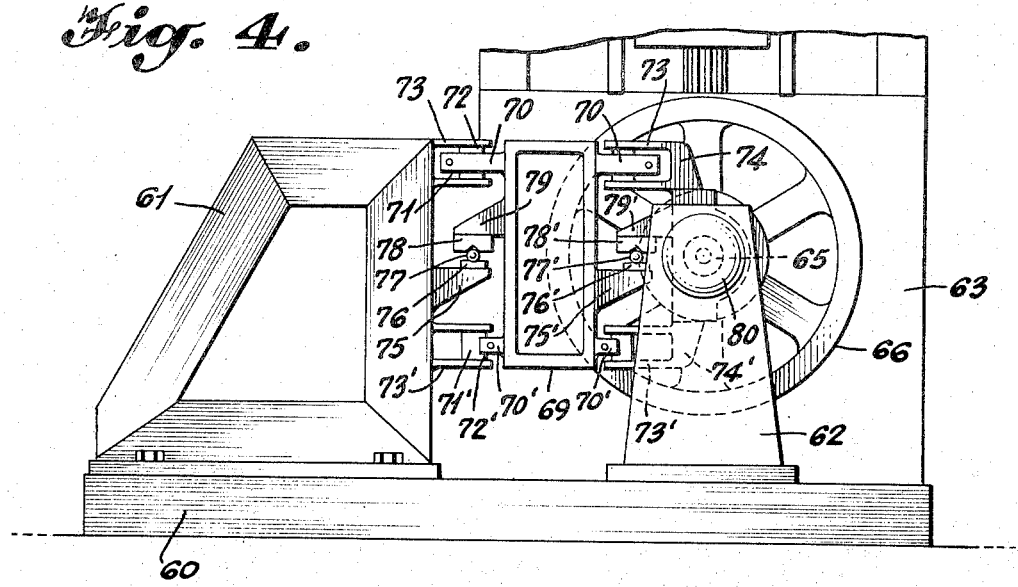
FIGS. 4 and 5 represent in front view and in top view, respectively, a part of the apparatus of FIG. 1 modified to measure the angular displacements due to the drift thrusts.

The apparatus illustrated in FIGS. 1, 2 and 3 is for measuring the radius variations and the longitudinal displacements in loaded rotating tires and consists of a base 1 on which there are assembled two standards 2 and 2′, and a support consisting of two other standards 3 and 3′ and a ledger 4. A vertical frame 5 is integral rearwardly with the base 1. The two standards 2 and 2′ bear a supporting journal 6 on which there is assembled an arm 7, which may oscillate by rotating about said journal.

The arm 7 is provided at one side with an extension 8 carrying at its end a plate 9 to which is tightly secured the lower edge of an air spring 10, the upper edge of said spring being tightly secured to the lower surface of the ledger 4. At the other side, the arm 7 bifurcates into two symmetrical extensions 11 and 11′ which support a journal 12 on which a test-drum 13 is loosely assembled.

A digital pick-up 14 is fastened to the ledger 4 in such a way that the rod 15, axially slidable inside the pick-up, engages a ledge 16 formed on the arm 7.

The frame 5 (see FIG. 2) contains an assembly which supports the pneumatic tire 17 to be tested in addition to the apparatus for controlling the moving parts of the apparatus. This assembly comprises a slide 18 slidable in a vertical direction along two guides 19 and 19′, a shaft 20 rotatably assembled in the slide 18 by means of the bearings 21 and 21′ and a wheel 22 keyed at the end of the shaft 20 which projects outwardly from the slide 18. The pneumatic tire 17 is assembled on the wheel 22.

Duct 23 extends axially through the shaft 20 and communicates at one end with a duct 24 in the wheel 22 to allow the immission of the inflating fluid inside the pneumatic tire 17. A flexible tube 25 is connected to the other end of duct 23 for the supply and the discharge of the inflating fluid.

The slide 18 moves by the action of a threaded shaft 26 which is screwed in a nut screw 27 formed in the upper part of said slide 18. The shaft 26 is assembled in a support 28 fastened to the upper portion of frame 5, which comprises two radial bearings 29 and 29′ and an axial bearing 30. Shaft 26 is placed into rotation by a direct current reversible motor 31 by means of a joint 32.

The rear portion of slide 18, extends into the frame 5, and is provided with a gear box 33, through which passes the shaft 20. On this shaft is keyed a ring bevel gear 34, meshing with a corresponding ring bevel gear 35. Gear 35 is fastened to the upper end of a shaft 36 having a vertical axis and rotating in the bearings 37 and 37′ which are encased in the lower extension 38 of slide 18. The lower end 39 of the shaft 36 is externally provided with longitudinal grooves and is inserted in a sleeve 40 having its interor provided with corresponding longitudinal grooves. The sleeve 40 is the extension of a joint 40′ assembled on the shaft of a speed reducer 41 which, through a pulley 42, a transmission belt 43 and a pulley 44, is connected to a reversible motor 45. The motor 45 is sustained by a support 46 and may oscillate about an axis 47, such oscillations being opposed by the action of a spring 48 and being transmitted by a digital pick-up 49 to the recording unit.

Referring to FIG. 1, microswitches 50 and 50′ are shown which control and check the motion of the slide 18. These microswitches are fastened on a plate 51 which is slidable on a guide 52 which may be adjusted by means of a screw 53, and are actuated by a ledge 54 formed on the slide 18. The microswitches 55 and 55′, directly secured on the frame 5, act as safety members to limit the maximum travel of the slide 18, and are respectively actuated by the ledges 56 and 56′, formed on the latter.

Figure 5:
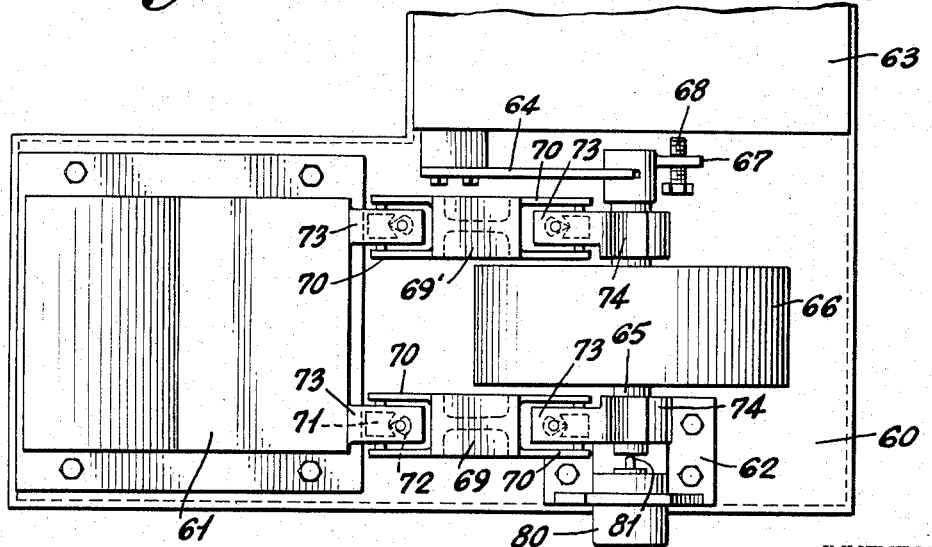

The apparatus partially represented in FIGS. 4 and 5 is provided to measure the lateral displacements of the pneumatic tires due to the drift thrusts, and differs from the one described above in the particular arrangement of the arm to which the test-drum is connected. In this arrangement, a support 61, a support 62, a rear frame 63, similar to that already illustrated with reference to FIGS. 1, 2 and 3, are fastened to a base 60. Frame 63 carries a leaf 64 which, along with the support 62, carries a supporting journal 65 on which the test-drum 66 is loosely assembled.

At its rear end, supported by the leaf spring 64, the journal 65 carries an extension 67 into which is screwed an adjustable stop element 68. The journal 65 is connected to the support 61 by means of two parallelogram shaped arms 69 and 69′ having eight linked connections, four for each arm, and four ball supports, two for each arm. Referring to FIGS. 6 and 7, the four upper linked connections, two for each arm, consist of a fork 70 at the ends of which there is pivoted a fulcrum 71 in whose cavity is inserted a knife 72. The knife 72 is pivoted at the ends of a fork 73, the latter being disposed 90° with respect to the fork 70. The axes of the forks 70 and 73 are aligned. The lower linked connections are analogous to the upper ones, the only difference being that the knife 72′ is pivoted on the fork 70′, while the fulcrum 71′ is pivoted on the fork 73′. The upper linked connections and the lower linked connections operate under opposite conditions, so that, when the former are actuated, the latter are released, and vice versa.

The forks 70 of the upper linked connections are respectively fastened to the arms 69 and 69′, while the forks 73 of said connections are respectively fastened to the support 61 and to arms 74 integral with the journal 65 of the test-drum 66.

The forks 70′ of the lower linked connections are respectively fastened to the arms 69 and 69′, while the forks 73′ of said connections are respectively fastened to the support 61 and to the arms 74′ integral with the journal 65 of the test-drum 66.

Two ball supports are provided for each of the two arms 69 and 69′. The support shown at the left in FIG. 4 consists of a bracket 75 integral with the support 61 and carrying a plate 76 on which leans the ball 77 which is inserted in a suitable seat 78 formed in the arm 79 integral with the arm 69. Likewise the support shown at the right in FIG. 4 consists of a bracket 75′ integral with the arm 69 and carrying a plate 76′ on which leans the ball 77′ which is inserted in a suitable seat 78′ formed in the arms 79′ integral with the journal 65 of the test-drum 66. A digital pick-up 80 is assembled on the support 62 in such a way that the rod 81 which is axially slidable inside the pick-up, may lean at the end of the journal 65 of the test-drum 66.

Figure 8:
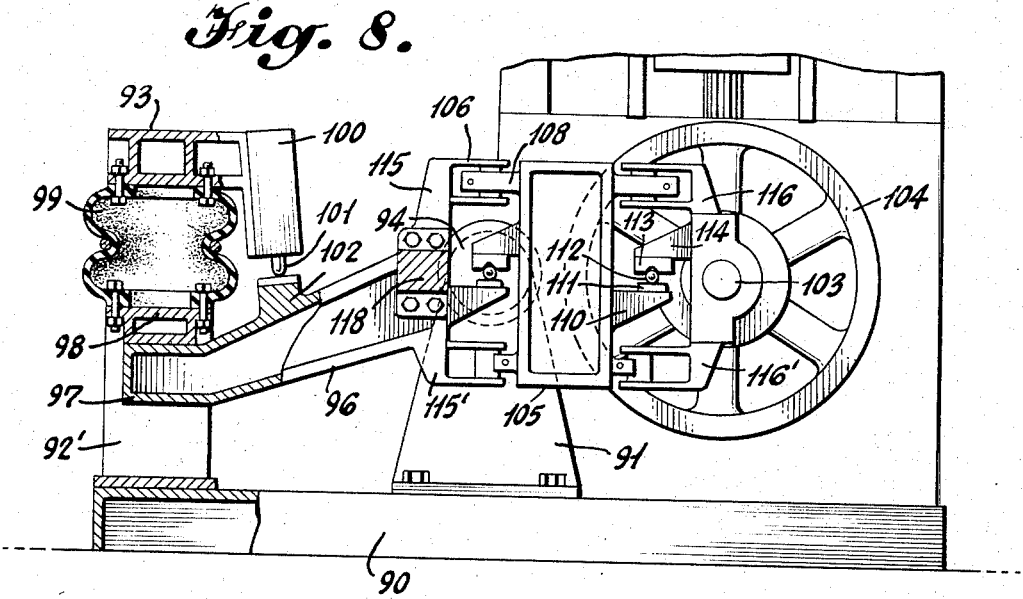
FIGS. 8 and 9 represent in front view, partially sectioned, and in top view, respectively, a part of the apparatus of FIG. 1, modified to measure the variations of the radius under load and of the lateral displacements due to the drift thrusts.
Figure 9:
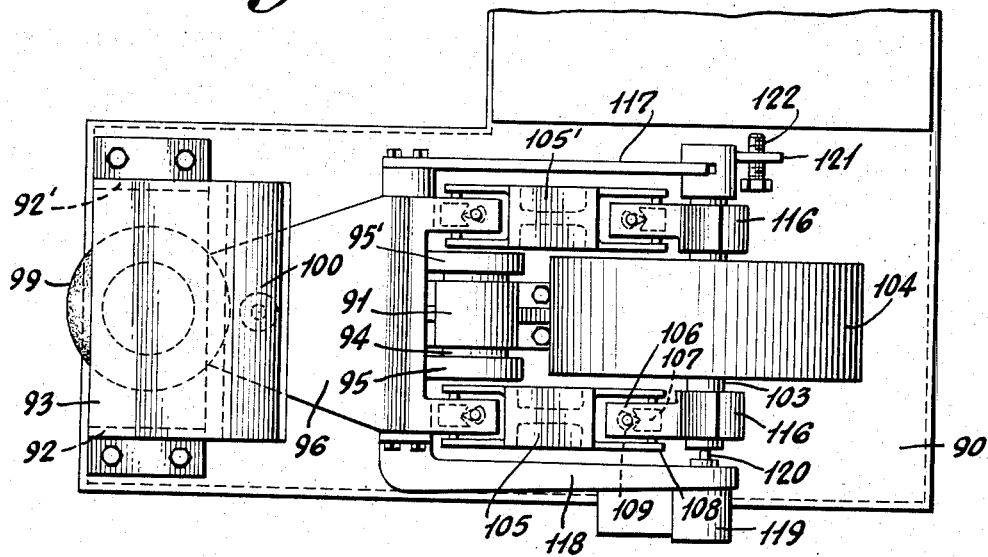

The apparatus partially represented in FIGS. 8 and 9 is intended to measure both the variations of radius under load and the lateral displacements due to the drift thrusts in the pneumatic tires. In regard to the oscillating arm, to which the test-drum is connected, this arrangement includes the features of both the arms previously described.

Specifically, a support 91 and a support consisting of two posts 92 and 92′ and ledger 93 are secured to a base 90. The support 91 bears a supporting journal 94 inserted in the two extensions 95 and 95′ of an arm 96, which may oscillate by rotating about said journal. The arm 96 is provided at one side with an extension 97 carrying a plate 98 to which is tightly fastened the lower edge of an air spring 99, the upper edge of which is tightly fastened to the lower surface of the ledger 93. The ledger 93 carries, integral with it, a digital pick-up 100, inside which a rod 101 is axially slidable. The end of arm 101 leans on the ledge 102 obtained on the arm 96.

A supporting journal 103, on which a test-drum 104 is loosely assembled, is supported by the oscillating arm 96 by means of two additional arms 105 and 105′ having the shape of a parallelogram. These arms are provided with eight linked connections and four ball supports of the type mentioned above. Each linked connection comprises a fork 106 in which there is pivoted a fulcrum 107, and a fork 108 in which there is pivoted a knife 109 co-operating with the fulcrum 107 (see FIGURE 9). Each ball support comprises a bracket 110 carrying a plate 111, a ball 112 and a seat 113 integral with an arm 114, as seen in FIG. 8. These connections and supports are respectively connected to the extensions 115 and 115' of the arm 96, to the parallelogram shaped arms 105 and 105' and to the arms 116 and 116' integral with the journal 103 of the test-drum 104. The arm 96 also has fastened to it the end of a leaf spring 117, the other end of which is secured to the journal 103 of the test-drum 104.

Referring to FIG. 9, an extension 118 is also secured to the arm 96 and carries at its end a digital pick-up 119 within which is an axially slidable rod 120, the latter normally engaging the end of the journal 103. At the end opposite to that bearing the leaf spring 117, the journal 103 is provided with an extension 121 into which is screwed an adjustable stop element 122.

With the exclusion of the operations necessary to assemble and disassemble the tire, the operation of the apparatus is completely automatic.

At the beginning of each test, the slide 18 is in the highest position (see FIGS. 1 and 2) on the frame 5. The tire 17 is assembled on the wheel 22 and, by pushing a suitable push-button, it is inflated by immitting compressed air through the ducts 25, 23 and 24. When the inflation pressure has reached the pre-established value, a pressure gauge controls the actuation of the motor 31 which places into rotation the threaded shaft 26 causing it to be screwed in the nut screw 27 of the slide 18.

The slide 18 thus lowers at a certain speed until the stop 54 pushes against the microswitch 50' which controls the slowing down of the motor 31 and consequently that of the slide 18. The peripheral surface of tire 17 therefore engages the peripheral surface of test-drum 13, thus effecting the rotation of the arm 7 about the journal 6. The arm 7, in its rotation, pushes the rod 15 of the pick-up 14, which actuates a microswitch. This microswitch controls the stop of the motor 31, and the consequent stop of the slide 18 in the position desired for the test. In this condition the air spring 10 has a length which corresponds exactly to its original length. Starting from this position, the spring can be stretched or compressed according to the oscillations of the arm 7. At this moment the motor 45 is started (see FIG. 2). This motor, through the pulley 44, the transmission belt 43, the pulley 42, the speed reducer 41, the joint 40', the shaft 39 and the bevel gears 35 and 34, originates the rotation of the shaft 20 and consequently of the tire 17. This causes rotation of test drum 13 and any variations in the tire radius will cause arm 7 to oscillate about journal 6.

The tire carries out a certain number of initial settling revolutions, which are noticed by the electronic recording device which will be described herebelow. Then the tire carries out a pre-established number of test revolutions, during which the required data is obtained. After the test revolutions, the motor 45 is stopped and the motor 31 is re-actuated, and, rotating in a direction contrary to the initial direction, causes the slide 18 to move upward along the guides 19 of the frame 5. This movement continues until the guide reaches the highest position, causing the stop 54 to engage the microswitch 50. Then the tire is automatically deflated and removed from the apparatus.

In connection with the apparatus as represented in FIGS. 4 and 5, which is provided for the measurement of the lateral displacements due to the drift thrusts, it should not be noted that its operation is the same as described above regarding the steps of starting the apparatus, inflating the tire, lowering the slide, rotating the tire as it engages the test-drum under a pre-established load.

In this case the test-drum 66, loosely assembled on the journal 65, is subjected to drift thrusts and is therefore displaced in two directions along the axis of said journal. These lateral displacements are detected and transmitted to the recording unit by means of the digital pick-up 80. The linked connections of the parallelogram shaped arms 69 and 69', described in FIGS. 6 and 7, and the leaf spring 64 allows the test-drum 66 to displace along its own axis in response to variations in tire drift thrust, the test-drum always remaining parallel to itself.

After the initial settling revolutions, the tire is caused to carry out a certain number of test revolutions, at first clockwise and then counterclockwise. The obtained data is then recorded. The tire is then stopped, deflated and removed in the already described way.

In connection with the apparatus represented in FIGS. 8 and 9, which is provided for the combined measurement of the variations of the radius and of the lateral displacements of a loaded rotating tire, it should be noted that its operation is the same described above as regards the steps of starting the apparatus, inflating the tire, lowering the slide and rotating the tire as it engages the test-drum under a pre-established load.

In this case the test-drum 104 is loosely assembled on the journal 103, and is supported by the arm 96 oscillating about the journal 94. During the test revolutions, the variations of the radius of the tire affect the rotation of the arm 96 about the journal 94, this rotation being opposed by the action of the air spring 99.

The digital pick-up 100 detects the vertical displacements of the arm 96 and transmits them to the recording unit.

During the test revolutions, drift thrusts are originated which compel the test-drum 104 to displace along its own axis, remaining however parallel to itself by virtue of the linked connections provided on the parallelogram shaped extensions 105 and 105' of the arm 96 and of the leaf spring 117. The lateral displacements of the test-drum 104 are detected by the digital pick-up 119, assembled in contact with the journal 103 of the test-drum, and are transmitted to the recording unit. The settling and test revolutions, the stopping of the tire, its deflation and its removal are carried out as described above.

FIG. 10 illustrates the blocks diagram of the circuit for measuring and recording the data obtained from the tests. This circuit includes a plurality of electronic devices which are connected to the apparatus for the combined measurement of the variations of the radius, of the lateral displacements, and of the variations of the longitudinal forces in loaded rotating tires.

The determination is carried out according to the following sequence: variation of the radius of the loaded rotating tire, the lateral displacement originated by the drift thrust when the tire rotates clockwise, the lateral displacement originated by the drift thrust when the tire rotates counterclockwise, and the longitudinal displacement.

The pick-ups 49, 100 and 119 "feel" the linear displacements and transform them by means of a rack-pinion system into angular clockwise and counterclockwise movements.

These angular movements are converted into trains of pulses, a certain angular displacement corresponding to each pulse. The pick-up is able to transmit the pulses on two separate channels, one for the clockwise rotations and the other for the counterclockwise rotations. The frequency of the pulses is proportional to the angular velocity and consequently to the linear velocity of the sensitive elements of each pick-up.

The trains of pulses are directed to a discriminator A, into which they penetrate through six gates (one for each train of pulses) controlled in pairs (one pair for each pick-up) by a measures scanner B, in such a way as to allow alternate passage of the train of pulses of a single pick-up.

Two channels depart from the discriminator A, each carrying a train of pulses to a block C which consists of three binary counters. The first of these counts are pulses of one channel, the second counts the pulses of the other channel, and the third counts the pulses of one channel according to a "forward" counting, and the pulses of the other channel according to a "rearward" counting. The content of the third totalizer counter is continuously compared with that of the other two counters—it allows the passage of the pulses counted by the latter to the next phase only after the contents are equal which causes the "out" gate to open.

In other words, the information supplied by the first channel is recorded by the first binary counter and by the totalizer since at the beginning of the test all the devices are zero-adjusted and therefore have an equal content.

One of the binary counters and the totalizer record the same information and, since their contents are again equal, the "out" gate opens and this information is allowed to pass.

The next information reaches block C through the second channel, attaining both the secondary binary counter and the totalizer. Three different situations will thus arise.

In the first situation, the new information has an absolute value lower than the preceding one. The totalizer then carries out a "rearward" counting, and its content is partially discharged. The binary counter and the totalizer will have different contents, resulting in the "out" gate remaining closed.

In the second situation the new information has an absolute value equal to that of the preceding one. The totalizer thus carries out a "rearward" counting and is completely discharged, but, since its earlier content was different from that of the second binary counter, the "out" gate still remains closed.

In the third situation the new information has an absolute value higher than the preceding one. The totalizer thus discharges completely so that its content becomes equal to that of the second binary counter. Then the totalizer, together with this counter, records the difference of the two informations and, owing to the equality of the contents, the "out" gate opens to transmit an information corresponding to the sum of the absolute values of the information recorded in the two binary counters.

In other words, a series of information outcomes from block C, each corresponding to a new maximum value of the displacements in two respects, originated by the defects of the loaded rotating tire.

The pulses then reach a trans-coder D, which codifies them according to a decimal code and transmits them to a display E, which gives a numerical indication of hundredths of a millimeter. The signal outcoming from the trans-coder D is then transmitted to a tolerance discriminator F, and, at the same time, to a print-allowing device G. The maximum tolerance limit is established by means of a switch H connected to the discriminator F. The latter also controls the alternative lighting of two lamps I and L of different colors, one of which indicates that the data supplied by the test falls within the pre-established tolerance limits, and the other indicating that this condition is not met. The data are also transmitted to a printer M which accords them in different colors.

At each revolution of the tire under test, a revolution counter N transmits a pulse to a binary counter O, which is therefore able to record the revolutions carried out by the tire.

The counter O codifies in decimal code the received signal and then transmits it, through two gates P and Q respectively, to a reset device R and to an oscillator S. A switch T pre-establishes the number of settling revolutions of the tire and is connected to the gate P. Likewise, a switch U pre-establishes the number of test revolutions and is connected to the gate Q.

The gate Q is closed during the settling revolutions and is opened at their end by the signal outcoming through the gate P, this signal also being transmitted to the reset device R which controls the zero-setting of the whole circuit.

The test revolutions are indicated by the counter N and pass through the gate Q, reaching the oscillator S which controls a start print device V. The latter transmits a signal to the print-allowing device G, which controls the accumulation of the data in the printer M. The signal outcoming from the print-allowing device G is sent also to the measures scanner B which, after a certain reading time, actuates the reset device R, thus zero-setting the circuit. This predisposes the discriminator A in such a way that the passage of the next train of pulses is allowed in accordance with the initially cited sequence.

At the end of the whole measuring cycle of one tire, the measures scanner B allows the printer M to operate. All the data concerning the tire is then collected in a single line.

In conclusion, the advantages of the apparatus forming the object of the present invention are:

(1) the possibility of using it industrially owing to the fact that said apparatus is not provided with instruments requiring a continuous calibration and to the fact that the obtained numerical and visual indications may be interpreted even by non-skilled operators, and (2) the possibility of recording all the typical data relating to the behavior of the pneumatic tire, and ensuring the precision and the reliability of the data so obtained.

Of course, variations in the specific cnstruction of the apparatus disclosed herein can be made by those skilled in the art without departing from the invention as defined in the appended claims.

What is claimed is:

1. An apparatus for checking pneumatic tires comprising a frame; a support member carried by said frame; a shaft rotatably mounted in said support member and carrying a wheel adapted to support a tire to be tested; means for rotating said shaft at a constant speed; means for inflating said tire on said wheel; a support arm pivotally mounted adjacent said frame; a test drum loosely assembled on one end of said support arm; a pair of parallelogram-shaped arms supporting said test drum, said parallelogram-shaped arms being provided with linked connections and ball supports permitting said test drum to be displaced laterally in response to variations in drift thrust; means to move said support member with respect to said frame to and from a position whereby said tire operatively engages said test drum, the other end of said support arm thus being displaced according to variations in the radius of said tire; means to detect said displacements; and means to display the values of said displacements.

2. The apparatus of claim 1 wherein said support member is moved at two different speeds, the lower of which occurs as the tire approaches the immediate vicinity of said test-drum.

3. The apparatus of claim 1 wherein said means for inflating the tire comprises an axial duct extending through said shaft, a radially extending duct in said wheel communicating with one end of said axial duct, and a source of compressed fluid at the other end of said axial duct.

4. The apparatus of claim 1 further comprising a resilient means operatively connected to said other end of, and balancing, said support arm.

5. The apparatus of claim 1 further comprising means to detect said lateral displacements and means to display the values of said lateral displacements.

6. The apparatus of claim 1 further comprising a leaf spring intended to oppose said lateral displacements.

7. The apparatus of claim 1 wherein said means for rotating said shaft comprises a motor operatively connected to said shaft, the stator of said motor being adapted to oscillate about its own axis in response to variations in motor torque required to rotate said shaft; and further comprising means to detect the stator displacements, and means to display the values of said stator displacements.

8. The apparatus of claim 7 further comprising a resilient member operatively connected to said stator to oppose said stator displacements.

9. The apparatus of claim 7 wherein said means for detecting said displacements, said lateral displacements, and said stator displacements comprises a plurality of digital pickups.

10. The apparatus of claim 7 wherein said means to display the values of said displacements, said lateral displacements and said stator displacements is an electronic digital apparatus, comprising a counter in which said measurements are displayed, means to record said measurements and a light signal adapted to display a different color according to whether said value is within or without predetermined limits.

11. An apparatus for checking pneumatic tires, comprising a frame; a support member carried by said frame; a shaft rotatably mounted in said support member and carrying a wheel adapted to support a tire to be tested; means for rotating said shaft; means for inflating said tire on said wheel; a support arm mounted adjacent said frame; a test-drum loosely assembled on a shaft; a pair of parallelogram shaped arms having linked connections and ball supports connecting said shaft to said support arm, thus permitting said test-drum to be displaced laterally on said shaft in response to variation in drift thrust; means to detect said lateral displacements, and means to display the values of said displacements.

12. An apparatus for checking pneumatic tires mounted on a support wheel rotating at a constant speed; said device comprising a test-drum maintained in a balanced condition and adapted to be engaged by said tire; means responsive to variations in tire radius to change said balanced condition; means supporting said test-drum to permit lateral displacements thereof in response to variations in tire drift thrust, and means responsive to variations in motor torque required to rotate said shaft.

13. The apparatus of claim 12 further comprising means to detect and record said change in balanced condition, said variations in tire radius and said variations in motor torque required to rotate said shaft.

References Cited

UNITED STATES PATENTS

| | | | |
|---|---|---|---|
| 1,904,542 | 4/1933 | Schaper | 177—178 |
| 2,695,520 | 11/1954 | Karsai | 73—146 |

LOUIS R. PRINCE, *Primary Examiner.*

DONALD O. WOODIEL, *Assistant Examiner.*

UNITED STATES PATENT OFFICE
CERTIFICATE OF CORRECTION

Patent No. 3,375,714                      April 2, 1968

Franco Bottasso

It is certified that error appears in the above identified patent and that said Letters Patent are hereby corrected as shown below:

Column 1, line 24, "displaced" should read -- displayed --. Column 3, line 51, "interor" should be -- interior --. Column 5, line 64, cancel "not". Column 6, line 70, "are" should read -- the --. Column 7, line 55, "accords" should read -- records --. Column 8, line 22, "cnstruction" should read -- construction --.

Signed and sealed this 9th day of September 1969.

(SEAL)
Attest:

Edward M. Fletcher, Jr.                WILLIAM E. SCHUYLER, JR.
Attesting Officer                         Commissioner of Patents